US012761021B2

(12) United States Patent
Maack et al.

(10) Patent No.: US 12,761,021 B2
(45) Date of Patent: Oct. 13, 2026

(54) DIGITAL SPIRIT LEVEL

(71) Applicant: Robert Bosch GmbH, Stuttgart (DE)

(72) Inventors: Stephanie Maack, Filderstadt (DE); Felix Schulz, Stuttgart (DE); Florian Giesen, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 312 days.

(21) Appl. No.: 18/557,752

(22) PCT Filed: May 12, 2022

(86) PCT No.: PCT/EP2022/062874

§ 371 (c)(1), (2) Date: Oct. 27, 2023

(87) PCT Pub. No.: WO2022/243142

PCT Pub. Date: Nov. 24, 2022

(65) Prior Publication Data

US 2024/0219176 A1 Jul. 4, 2024

(30) Foreign Application Priority Data

May 19, 2021 (DE) ..................... 10 2021 205 075.1

(51) Int. Cl.
*G01C 9/06* (2006.01)

(52) U.S. Cl.
CPC ......... *G01C 9/06* (2013.01); *G01C 2009/066* (2013.01)

(58) Field of Classification Search
CPC ........................................................ G01C 9/26
USPC ......................................... 33/366.11, 366.27
See application file for complete search history.

(56) References Cited

U.S. PATENT DOCUMENTS

| | | | | |
|---|---|---|---|---|
| 4,182,046 A * | 1/1980 | Ludlow | G01C 9/26 D10/69 |
| 4,507,657 A * | 3/1985 | Bates | G01C 9/10 340/963 |
| 5,031,329 A | 7/1991 | Smallidge | |
| 5,136,784 A * | 8/1992 | Marantz | G01C 9/16 33/366.27 |

(Continued)

FOREIGN PATENT DOCUMENTS

| | | | |
|---|---|---|---|
| DE | 693 18 160 T2 | 8/1998 |
| DE | 10 2016 014 988 A1 | 6/2018 |
| GB | 2 158 230 A | 11/1985 |

OTHER PUBLICATIONS

International Search Report corresponding to PCT Application No. PCT/EP2022/062874, mailed Sep. 15, 2022 (German and English language document) (7 pages).

(Continued)

*Primary Examiner* — George B Bennett

(74) *Attorney, Agent, or Firm* — Maginot, Moore & Beck LLP

(57) ABSTRACT

A digital spirit level has an at least substantially cuboid or prismatic housing, wherein at least one surface of the housing is designed as a supporting surface for placing the digital spirit level on a workpiece which is to be oriented with respect to the earth's gravitational field. A digital display unit, which is controlled by an electronic control device and is designed to display to a user the orientation of the housing with respect to the earth's gravitational field in an intuitively perceivable manner, is arranged at least in the region of a further surface of the housing.

18 Claims, 5 Drawing Sheets

(56) References Cited

U.S. PATENT DOCUMENTS 5,153,999 A * 10/1992 Sharpe ................. B23Q 1/5406
33/366.12
5,313,713 A * 5/1994 Heger ...................... G01C 9/06
33/343
5,335,190 A 8/1994 Nagle et al.
5,456,014 A * 10/1995 Wilson ..................... G01C 9/36
33/390
5,479,715 A * 1/1996 Schultheis ............... G01C 9/32
33/366.27
5,488,779 A * 2/1996 Schultheis ............... G01C 9/32
33/366.27
5,780,848 A * 7/1998 Thompson ............... G01C 9/20
33/366.11
5,875,560 A * 3/1999 Boe ....................... H01L 21/681
33/366.11
5,956,260 A * 9/1999 Heger ...................... G01C 9/06
345/23
6,037,874 A 3/2000 Heironimus
8,661,701 B2 * 3/2014 Wixey ..................... G01C 9/06
33/534
10,921,122 B2 * 2/2021 Leo ......................... G06F 13/24
11,668,563 B2 * 6/2023 Sakakibara .............. G01C 9/04
33/366.27
12,104,924 B1 * 10/2024 Henchon .................. G01C 9/06
2007/0193046 A1 8/2007 Arlinsky
2014/0144031 A1 * 5/2014 Ueyama ............... H04N 23/633
33/366.13
2014/0237837 A1 8/2014 Wixey et al.
2016/0084648 A1 * 3/2016 Zhuang .................. G01B 21/22
702/151
2019/0226845 A1 7/2019 Leidel et al.
2020/0363201 A1 11/2020 Neitzell et al.
2023/0204354 A1 * 6/2023 Chae ........................ G01C 9/04
33/366.11
2024/0288269 A1 * 8/2024 Dorrough ................ G01C 9/06

OTHER PUBLICATIONS

Holl & Span GmbH, "Messflex für schnelle, exakte Abmessungen: Handwerker-Tool kombiniert Messlatte mit Smartphone und App—openPR," Oct. 6, 2020, https://www.openpr.de/news/1103123/MESSFLEX-fuer-schnelle-exakte-Abmessungen-Handwerker-Tool-kombiniert-Messlatte-mit-Smartphone-und-App.html (5 pages).

* cited by examiner

DIGITAL SPIRIT LEVEL

This application is a 35 U.S.C. § 371 National Stage Application of PCT/EP2022/062874, filed on May 12, 2022, which claims the benefit of priority to Serial No. DE 10 2021 205 075.1, filed on May 19, 2021 in Germany, the disclosures of which are incorporated herein by reference in their entirety.

BACKGROUND

The present disclosure relates to a digital spirit level having an at least substantially cuboid or prismatic housing, wherein at least one surface of the housing is designed as a supporting surface for placing the digital spirit level on a workpiece which is to be oriented with respect to the earth's gravitational field.

From the prior art, analogous levels are known which are equipped with at least one level filled with liquid in order to orient a workpiece vertically, horizontally, at 45°, or optionally at any other arbitrary angle. In addition, digital spirit levels and/or inclinometers are known, which generally display, via a digital numerical display, at least one current angle of the spirit level relative to the earth's gravitational field. Such digital spirit levels may have a variety of other functions for displaying further measured values.

SUMMARY

The present disclosure relates to a digital spirit level having an at least substantially cuboid or prismatic housing, wherein at least one surface of the housing is designed as a supporting surface for applying the digital spirit level to a workpiece to be aligned relative to the earth's gravitational field. A digital display unit controlled by an electronic control device is arranged at least in the region of a further surface of the housing, the digital display unit being designed to intuitively display to a user the orientation of the housing with respect to the earth's gravitational field.

Relatively good work results are achievable even for technically inexperienced users this way. The digital display unit can be designed to be removable from the housing of the digital spirit level, such that it can, for example, be used as a miniature spirit level or as a compact goniometer. For this purpose, the digital display unit is preferably able to be accommodated and attached in the housing without play.

According to an advantageous further development, the digital display unit comprises at least one digital display, in particular a bar display, for displaying at least one angular deviation between a longitudinal direction of the housing and the horizontal or vertical, or an angular deviation from a target angle that may be predetermined by the user, wherein the horizontal is perpendicular, and the vertical is parallel, to the earth's gravitational field.

Because of the digital bar display, both a qualitative and a quantitative representation of the angular deviation and of reaching a desired leveling state or a specified orientation relative to the horizontal or vertical can be achieved. For example, the target angle may be a common angle relative to horizontal or vertical.

Preferably, the digital display unit comprises at least two digital displays, in particular bar displays, spaced apart from each other in the longitudinal direction of the housing.

The two digital displays are preferably positioned at the same height relative to the longitudinal direction. Particularly preferably, the two digital displays indicate a corresponding angular deviation in opposing senses. Due to the opposing nature of the display, it can be clearly seen by the user which end of the cuboid housing of the digital spirit level is to be raised or lowered in order to achieve the desired leveling or vertical orientation, i.e., to achieve a desired angular deviation of nearly 0°. Preferably, the at least one digital display unit itself is positioned centrally between two ends of the housing of the digital spirit level in the region of a surface of the housing. In principle, except for at least one surface of the housing designed as a supporting surface, any surface of the housing may comprise a digital display unit.

According to a technically advantageous embodiment, the at least two digital displays are each designed with at least three, preferably with at least seven LED segments.

This results in a display which is readable by the user regardless of the viewing angle, the measurements indicated thereby being intuitively understandable. Alternatively or in addition, the at least one digital display can, in contrast with LED technology, also be realized using especially low-power LC segments in the form of an LC display (so-called liquid crystal display or LCD), the display having a preferably multi-colored background lighting. Alternatively, for example, a sufficiently high-resolution LC matrix display or an OLED display may also form the display unit.

Preferably, each of the LED segments of the at least two digital displays may provide illumination controlled by the electronic control device, the illumination being in three different colors, preferably green, yellow, and red.

Thus, for example, the magnitude of an angular deviation can be intuitively visualized to the user as in a traffic light. For example, red-illuminating LED segments may represent a large angular deviation, while yellow-illuminating LED segments indicate an average angular deviation and green-radiating LED segments indicate a leveled orientation of the workpiece, i.e., with no appreciable angular deviation. The LED segments as well as the optional LC segments may have a shape that deviates from a simple quadrilateral geometry, for example contouring may be included. For example, the LED segments at the end may be designed like an arrow, or the LED segments that indicate the leveled state, or an angular deviation of 0°, may have a greater width than the remaining LED segments. The arrow-shaped geometries of the LED segments at the end are preferably oriented opposite to one another. Moreover, individual LC segments may have a different length to indicate, by way of the arrow length, a proportional change in the angular deviation. A long arrow represents an angular deviation which is still large, whereas a short arrow represents a nearly precise orientation.

Preferably, a color of the LED segments varies as a function of a current magnitude of the angular deviation.

Thus, the user may easily estimate how much further the workpiece to be oriented still needs to be inclined or tilted, i.e., how great the angular deviation still is from the horizontal or vertical, or from a user-specified angle. The color of each LED is preferably adjustable within the spectrum perceptible to the human eye.

Preferably, at least one scale having angle values is assigned to at least one digital display, in particular for carrying out quantitative angle measurements, each LED segment preferably being assigned to a respective angle value, and the at least one scale being oriented substantially parallel to the at least one digital display.

In this way, each LED segment is assigned a quantitative angular step so that the digital spirit level is not only usable for precise leveling or vertical alignment, but also for angle measurement. The scales may be linear or non-linear and printed, for example on the digital display unit or on the housing of the digital spirit level. Alternatively, the scales may be manufactured by an engraving process to increase wear resistance, and may preferably be in color.

Preferably, a color of the at least one scale corresponds to one of the adjustable colors of the LED segments.

This results in a clear mapping between the scale having the angle values and the bar displays. As a result, for example, the display accuracy of the digital spirit level, i.e., the angular resolution of the digital display unit, may also be adapted to the respective application requirements. Thus, for example, in the case of a linear scale, each LED segment may stand for a 0.1° step, a 1° step or a 10° step of the measured and displayed angular deviation.

Preferably, an acoustic signal transmitter may be controlled by the electronic control device as a function of a magnitude of the angular deviation.

This facilitates ease of use of the digital spirit level even if there is no visual connection to the user. For example, the magnitude of the angular deviation may be indicated by the frequency of a tone output from the acoustic signal transmitter and/or by a pulsed sequence of sounds at constant frequency. Furthermore, a haptic signal transmitter, for example a vibratory motor, may be used, for example, wherein the lack of vibrations signals a precise leveling or alignment relative to the vertical.

Preferably, at least one accelerometer is assigned to the electronic control device, preferably a MEMS accelerometer, to detect the angular deviation.

Alternatively, a sensor based on thermal convection or a capacitive sensor may also be used. Using a gyroscope sensor, the position of the spirit level can also be precisely detected in space in three axes. The abbreviation "MEMS" stands for the English language designation "Micro-Electro-Mechanical-System".

In the case of an advantageous embodiment, an input unit for the user for specifying the target angle is assigned to the electronic control device.

This can be used, for example, to easily check a roof slope or the proper grade of a wastewater line to be laid.

According to a further beneficial embodiment, the input unit is designed with a rotary knob having a display for specifying a target angle desired by the user.

The rotary knob or scroll wheel provides an intuitive operability of the digital spirit level. For important values of the target angle, such as 3°, 5°, 10° 15°, 22.5°, 30°, 45°, 60°, 75° or 80°, the rotary knob can have a detent that is haptically detectable by the user. Alternatively, it is possible to specify the target angle using, for example, two increment and decrement buttons. The rotary knob may optionally be countersunk flush so that the surface in which the rotary knob is integrated is not sacrificed as a supporting surface. The display may be realized using a mechanical or electronic digital display in order to further simplify the adjustment process of the target angle.

BRIEF DESCRIPTION OF THE DRAWINGS

The disclosure is explained in further detail in the following description with reference to exemplary embodiments shown in the drawings. Shown are.

DETAILED DESCRIPTION

Elements having the same or a comparable function are provided with the same reference signs in the figures and are described in further detail only once.

Figure 1:
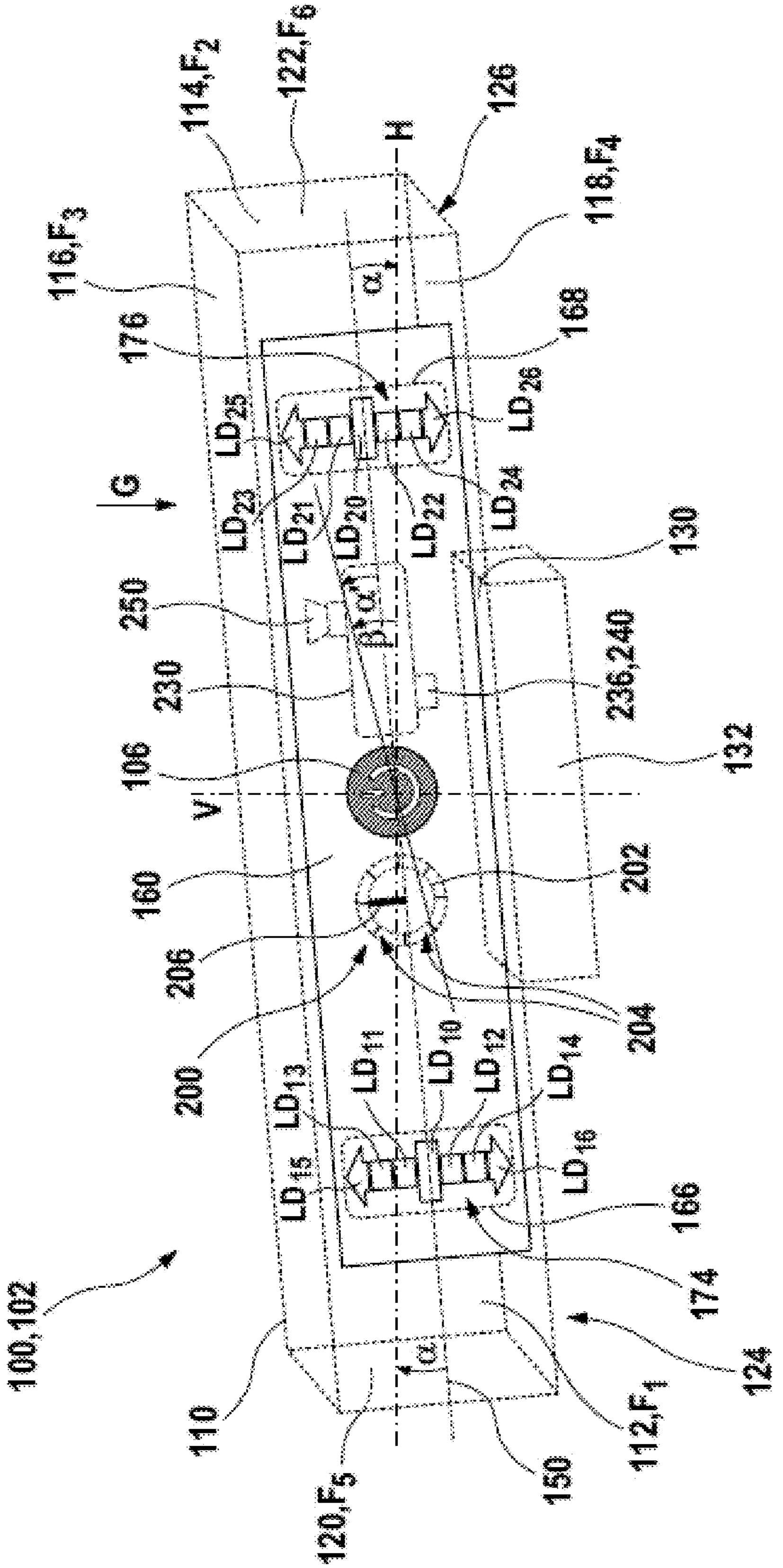
FIG. 1 a side perspective view of a digital spirit level.

FIG. 1 shows a side perspective view of a digital spirit level 100.

The digital spirit level 100 preferably has an at least substantially cuboid or prismatic housing 110. The digital spirit level 100 may also be embodied as a digital goniometer 102, the housing of which is then significantly shorter in a longitudinal direction 150 compared to the digital spirit level 100, so that more of a cubical housing results. The substantially cuboidal housing 110, which is only an example here, has, by way of illustration, a front side 112, a back side 114, a top side 116, a bottom side 118, a first end face 120, as well as a second end face 122 facing away from the first end face with respect to the longitudinal direction 150 of the housing 110. The front side 112, the back side 114, the top side 116, the bottom side 118, the first end face 120, as well as the second end face 122 of the housing 110 of the digital spirit level 100 are referred to as surfaces $F_{1, \ldots, 6}$ in the further course of the description in order to provide a better overview and to make labeling easier. The surface $F_4$. i.e., the bottom side 118, shown here is designed as a supporting surface 130, only as an example, that is flat at least in regions so that the digital spirit level 100 can be laid against a workpiece 132 to be aligned with respect to the earth's gravitational field G.

Figure 4:
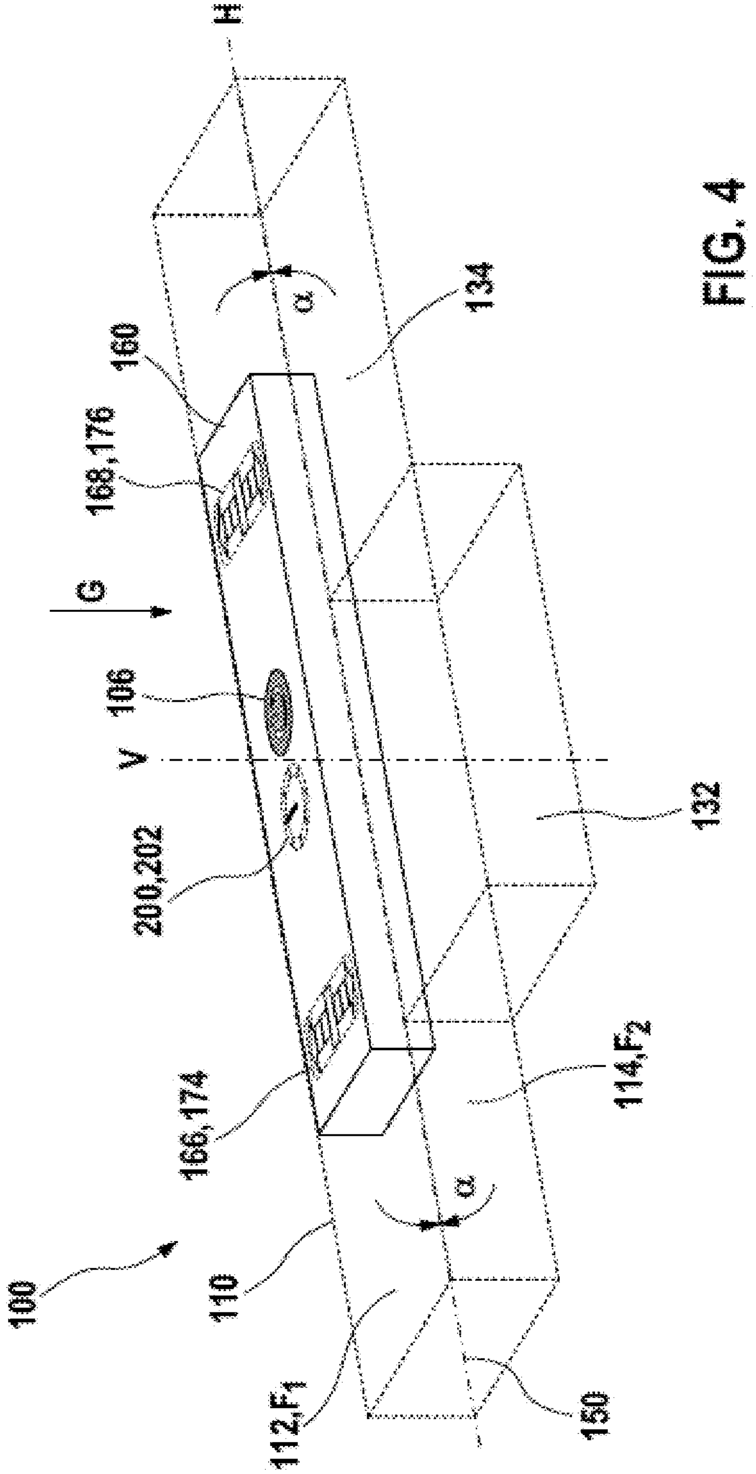

More than one of the surfaces $F_{1, \ldots, 6}$ on the housing 110 can be designed as a supporting surface, such that the spirit level 100 can be used, for example in a side position or in a back position that is rotated about the longitudinal direction 150, i.e., the longitudinal axis, by 90° (see in particular FIG. 4). In principle, each of the six surfaces $F_{1, \ldots, 6}$ can be embodied as a supporting surface.

A digital display unit 160 controlled by an electronic control device 230 is preferably arranged at least in the region of one of the surfaces F1,2,3,5,6 which does not function as supporting surface, the display unit being designed, according to the disclosure, to display to a user, not depicted, the orientation of the housing 110 of the digital spirit level 100 with respect to the earth's gravitational field G in an intuitively perceivable manner. Here, the digital display unit 160 is positioned approximately centrally between a first end 124 and a second end 126 of the housing 110 along its longitudinal direction 150. The digital display unit 160 may be fixedly integrated into or designed to be removable from the housing 110 by the user as needed.

By means of a button-like control element 106, the user may activate the electronic control device 230 and thereby the digital display unit 160. Control element 106 may be flush with surface $F_1$, i.e., the front of the housing 110 of digital spirit level 100.

Here, the digital display unit 160 only has, as an example, two digital displays 166, 168, each of which is preferably designed in the manner of a bar display 174, 176, the displays being spaced apart from one another in the longitudinal direction 150 of the housing 110. Alternatively, the digital display unit 160 may be implemented with only one digital display 166, preferably also designed in the manner of a bar display 174.

Using the digital indicators 166, 168, at least one angular deviation α may be indicated between the longitudinal direction 150 of the housing 110, i.e., the supporting surface 130 of the digital spirit level 110, and a horizontal H or vertical V. Moreover, it is preferred that an angular deviation α' from a user-specifiable target angle ß relative to the horizontal H or vertical V can be visualized by means of the two digital indicators 166, 168. By definition, the horizontal H is perpendicular to the earth's gravitational field G, whereas the vertical Vis oriented parallel to the earth's gravitational field G. Thus, the orientation of the workpiece 132, which is sitting against the supporting surface 130, relative to the horizontal H, the vertical V, or the user-specifiable angle ß can be determined by the user in an intuitively perceivable manner. For example, by means of the digital spirit level 100 the target angle ß may be used to easily verify that a grade of a wastewater line, a roof slope, a ramp, a driveway, or the like is being maintained.

The two digital displays 166, 168 are each constructed with at least three, but preferably with at least seven or a higher number of LED segments $LD_{10}$, . . . , 16, $LD_{20, \ldots, 26}$. The greater the number of LED segments employed, the greater the viable measurement range and the greater the angular resolution of the digital displays 166, 168. More than two digital displays embodied as a bar display may be provided. The LED segments $LD_{10, \ldots, 26}$ can be realized using so-called LED strips, for example, which have individually-controllable light emitting diodes. The LED segments $LD_{10}$, . . . , 14 of the digital display 166 are approximately rectangular here only as an example, the LED segment $LD_{10}$ having a larger width so as to indicate to the user that the zero line has been reached, whereas the outer LED segments $LD_{15,16}$, that is to say those located furthest out, are designed as triangles or arrow tips pointing away from one another to indicate, to the user, a direction in which the respective end 124, 126 of the spirit level 100 is to be raised, for example to achieve a leveling, i.e., to orient the longitudinal direction 150 of the housing 110 parallel to the horizontal H, i.e., the so-called zero line. The same applies to the seven LED segments $LD_{20, \ldots, 26}$ of the second digital display 168.

In the exemplary embodiment of FIG. 1, the LED segments $LD_{10,11,13,15}$ and the LED segments $LD_{20,22,24,26}$ are activated, i.e., illuminated, to indicate to the user in an intuitive manner that the first end 124 of the spirit level 100 is to be raised, and the second end 126 of the spirit level 100 is to be lowered, for example, in order to bring the angular deviation α to zero, i.e., to bring the workpiece 132 sitting against the spirit level 100 to exactly the horizontal H, for example. In this way, the user is intuitively informed how to position the workpiece 132 sitting against the digital spirit level 100 so as to achieve the desired orientation of the workpiece 132 in space. The bar displays 174, 176 are oriented substantially transverse relative to the longitudinal direction 150 of the housing 110.

A respective height of the bar displays 174, 176 of the displays 166, 168 of the digital display unit 160 is preferably proportional to the current magnitude of the current angular deviation α. Furthermore, a blinking frequency of the light-emitting diode segments $LD_{10, \ldots, 16}$ and the light-emitting diode segments $LD_{20, \ldots, 26}$ may be proportional to whatever angular deviation α that might remain, wherein a higher blinking frequency of the light-emitting diode segments signals that a larger angular deviation α still exists. The same applies to the angular deviation α' and the target angle β.

The target angle β is user-specifiable by means of an input unit 200 associated with the electronic control device 230. Merely as an example, the input unit 200 in this case is realized as an approximately cylindrical rotary knob 202. The rotary knob 202 is preferably at least partially surrounded by a scaled, circular ring-like display 204 fixed to the housing, above which a radially-outward directed pointer 206 formed on the rotary knob 202 moves. The pointer 206 is preferably used to visualize the user-adjusted target angle β. Alternatively, instead of the pointer 206, the rotary knob 202 can also have a window-like recess within which the adjusted target angle value B of the display 204 can be read off. In accordance with the design of the control element 106, the rotary knob 202 can also be flush with the surface $F_1$ of the housing 110. If necessary, the rotary knob 202 may be designed to be countersinkable. The rotary knob 202 may have a detent that is haptically detectable by the user for specifiable target angle values β, such as 3°, 5°, 10° 15°, 22.5°, 30°, 45°, 60°, 75°, or 80°.

Alternatively, the electronic control device 230 may be associated with an increment and decrement (up-down) button for the user for adjusting the target angle β. The user-specified target angle β and/or the current angular deviations α, α' from horizontal H and/or from vertical V may be displayed by an additional 7-segment or matrix LC display.

For example, instead of the rotary knob 202 illustrated in FIG. 1, a cylindrical, longitudinally-ridged scroll wheel or the like may also be provided for the user to input the target angle β.

Further, an acoustic signal transmitter 250 is associated with the electronic control device 230. The acoustic signal transmitter 250 is controllable using the electronic control device 230, preferably as a function of the current magnitude of the angular deviations α, α'. The magnitude of an angular deviation α, α' still present may, for example, be determined by the frequency of a continuous tone output from the acoustic signal transmitter 250 and/or by a faster or slower sequence of tone pulses, each at a constant frequency. Preferably, a frequency of the tones emitted by the acoustic signal transmitter 250 is in the frequency range perceptible to the human ear of between about 16 Hz and 20 kHz, at a loudness of up to 80 dB(a). For example, the acoustic signal transmitter may be implemented in the form of a piezo element and/or a speaker.

Furthermore, the electronic control device 230 may be associated with an electrical vibratory motor not shown in the drawing which, in the event of too large of an angular deviation α, α', may be activated under the control of the electronic control device 230 in order to demonstrate, in a haptic manner, to the user that, for example, the position of the spirit level 100 is at too large of a deviation relative to the horizontal.

To precisely detect the angular deviation α, α' through measurement, the electronic control device 230 preferably cooperates with at least one accelerometer 236. For example, the at least one accelerometer 236 may be realized using a MEMS accelerometer 240 (a so-called "Micro-Electro-Mechanical-System accelerometer").

Each of the fourteen LED segments $LD_{10, \ldots, 16}$, $LD_{20, \ldots, 26}$ of the two digital displays 166, 168 herein is preferably individually controllable by the electronic control device 230, that is to say at least it may be switched on and switched off, and optionally also dimmed. Moreover, each of the fourteen LED segments $LD_{10, \ldots, 16}$, $LD_{20, \ldots, 26}$ may be illuminated under the control of the electronic control device 230 in at least three different colors, for example green, yellow and red, which are perceptible to human eyes, and thus similar to a traffic light, for example. Further, each of the LED segments $LD_{10, \ldots, 26}$ can be designed as a so-called color changer that may illuminate under the control of the electronic control device 230 in all of the approximately 16.7 million RGB colors available in 8-bit color coding. In the simplest case, the color of the LED segments $LD_{10, \ldots, 16}$ as well as the LED segments $LD_{20, \ldots, 26}$ of the digital displays 166, 168 of the digital display unit 160 varies depending on the current magnitude of the angular deviation α, α'. If, for example, there is still a large angular deviation α, α', each of the fourteen LED segments $LD_{10, \ldots, 26}$ can illuminate in red, whereas if the angular deviation α, α' is only average, the LED segments $LD_{10, \ldots, 26}$ will illuminate in yellow and if there is only a minimal angular deviation α' then the LED segments $LD_{10, \ldots, \ldots, 26}$ emit green light.

A current angular resolution setting of the digital spirit level 100 may also be displayed to the user, for example using the three colors red, yellow, and green. Thus, for example, LED segments $LD_{10, \ldots, 26}$, illuminated in red, of the digital displays 166, 168 may represent 10° angle steps, whereas LED segments $LD_{10, \ldots, 26}$, radiating in yellow or green, represent 1° or 0.1° angle steps so that a quantitative angle measurement is also possible without associated (angle) scales.

In addition, instead of the described fourteen LED segments in realizing the two bar displays 174, 176, it is possible to use one or two LC displays (called Liquid Crystal Displays), each display having seven geometrically designed LC segments, each LC display having a background lighting that can illuminate at least in red, yellow or green. Preferably, the background lighting is embodied as an RGB background lighting having, for example, approximately 16.7 million depictable colors. The activation or deactivation of the individual LC segments as well as the control of the current color of the background lighting and/or the RGB background lighting are preferably carried out using the electronic digital control device 230. The lower energy demand on LC segments compared to LED segments has the advantage of a longer battery, or rechargeable battery, life. Moreover, LC segments can be more simply geometrically designed such that the LC segments may be formed as, for example, arrows of different lengths to illustrate to the user, in an intuitively perceptible manner, angular deviations α, α' of different magnitudes. In principle, the two digital displays 166, 168 may also be realized using digital matrix displays in multi-colored LED, LCD or OLED technology (so-called Organic Light Emitting Diodes).

Figure 2:
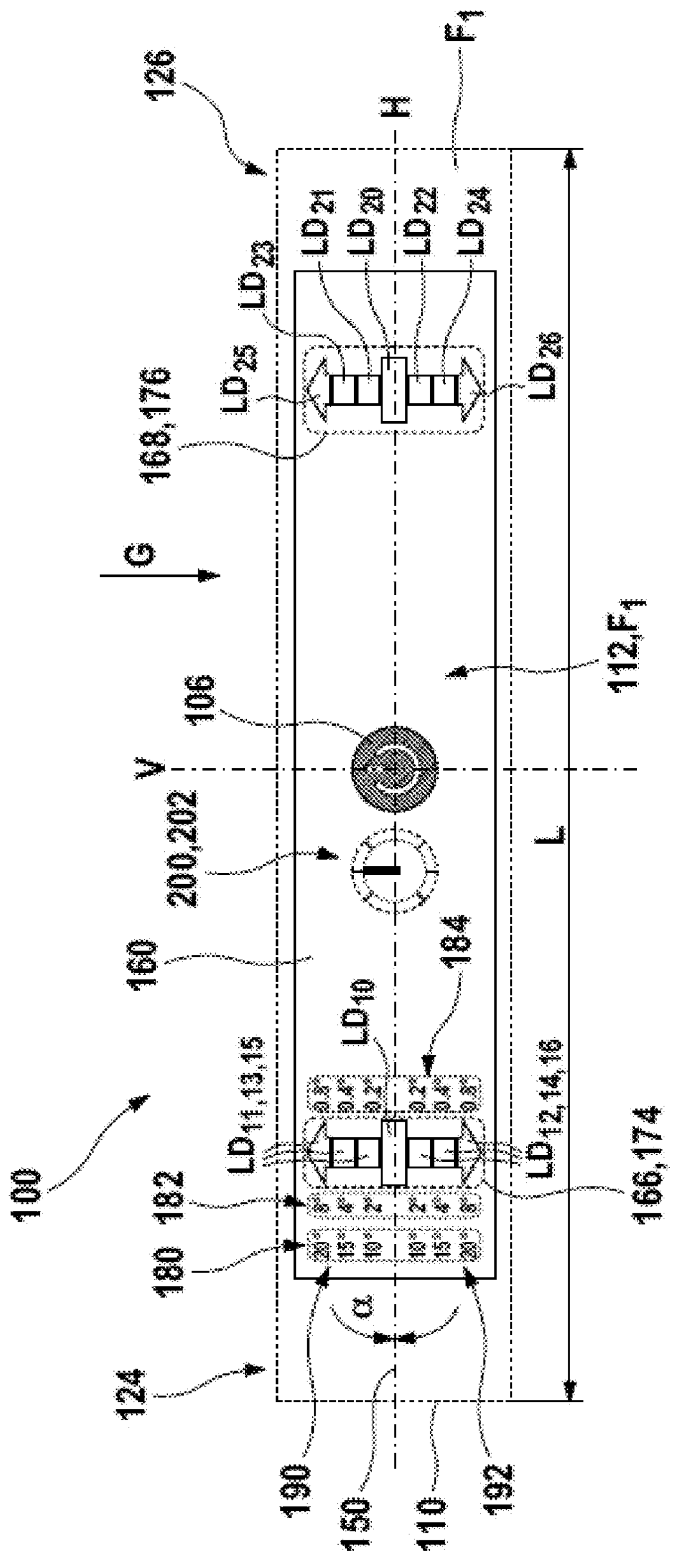
FIG. 2 a side view of the digital spirit level of FIG. 1 with three additional scales, FIG. 3 a perspective view of the spirit level of FIG. 1 in a side position, FIG. 4 a perspective view of the spirit level of FIG. 1 in a back position, and FIG. 5 an enlarged perspective view of an input unit designed as a rotary knob.

FIG. 2 shows the digital spirit level 100 of FIG. 1 with three additional scales. By way of illustration, the digital display unit 160 having the two digital displays 166, 168 is flush with the front side $F_1$ of the housing 110. The control element 106 as well as the input unit 200, which is realized as a rotary knob 202 as an example, is also countersunk flush into the digital display unit 160. The digital display 166 realized as a bar display 174 comprises the seven LED segments $LD_{10, \ldots, 16}$ and the digital display 168 realized as a bar display 176 comprises the seven LED segments $LD_{20, \ldots, 26}$.

The longitudinal direction 150 of the housing 110 of the digital spirit level 100 is, by way of illustration, parallel to the horizontal H and is perpendicular to the vertical V, such that the angular deviation α is zero here. It should be noted that the respective distances between the free ends 124, 126 of the housing 110 of the spirit level 100 and the digital display unit 160 having the two displays 166,168, which depend on a length L of the housing 110 of the spirit level 100, can be the same or unequal such that a symmetric or asymmetric arrangement of the display unit 160 results in the longitudinal direction 150. The earth's gravitational field G runs parallel to the vertical V and perpendicular to the horizontal H.

As an example, only the LED segments $LD_{10,20}$ of the digital displays 166, 168 are activated here, indicating to the user in an intuitively perceptible manner a leveled state, that is to say the orientation of the digital spirit level 100 is parallel to the horizontal H.

By way of illustration, two scales 180, 182 are provided to the left of the bar display 174 in the direction toward the end 124, and to the right of the bar display 174 a scale 184 is provided, wherein the scales 180, 182, 184 are preferably parallel to the bar display 174 and perpendicular to the longitudinal direction 150, respectively. Using scales 180, 182, 184, quantitative angle measurements are possible using the digital spirit level 100. Further bar display 176 may also be associated with one or more scales having angular values depending on the type of scales 180, 182, 184, if necessary. For example, the scales 180, 182, 184, which have a linear or a non-linear gradation, may be printed by means of laser engraving.

By way of example, each of the three scales 180, 182, 184 here comprises six angle values, each respective value being associated with one of the LED segments $LD_{11, \ldots, 16}$. No angular value is assigned here to the center LED segment $LD_{10}$, i.e., the "zero segment". Alternatively, the LED segment $LD_{10}$ can also be assigned the angular value 0° in each scale 180, 182, 184, respectively. The scales 180, 182, 184 are preferably designed in different colors, wherein, for example, the scale 180 is designed in a first color, the scale 182 in a second color, and the scale 184 having angular values in a third color corresponding to the colors which can be turned on in the bar display 166 accordingly. Thus, by providing the bar display 174 in one of the colors of the scales 180, 182, 184, the user may be shown which scale 180, 182, 184 is currently valid. For example, in the illustration of FIG. 2, the center LED segment $LD_{10}$ of the bar display 174 illuminates in the second color so that the scale 182 designed in the second color will apply with its associated angle values 2°, 4° and 8°. The same applies to the scale 180 configured in the first color and the scale 184 configured in the third color.

By way of illustration, each of the scales 180, 182, 184 also preferably has an upper half 190 and a lower half 192 with three angular values each, i.e., for example the scales 180, 182, 184 are symmetrically constructed with respect to the LED segments $LD_{10,20}$. The angular values of the lower half 192 of the scales 180, 182, and 184 may each be assigned a negative sign, if appropriate, for ease of differentiation.

The scale 180 preferably contains three linear angular values 10°, 15°, 20° in the upper and lower half 190, 192 in increasing order, wherein the LED segments $LD_{11,12}$ are each assigned the angular value 10°, the two LED segments $LD_{13,14}$ are each assigned the angular value 15° and the two LED segments $LD_{15,16}$ are each assigned the angular value 20°. Similarly, the scale 182 preferably comprises the non-linear angular values 2°, 4° and 8°, wherein the angular value 2° is assigned to each of the LED segments $LD_{11,12}$, the angular value 4° is assigned to each of the LED segments $LD_{13,14}$ and the angular value 8° is assigned to each of the LED segments $LD_{15,16}$. The scale 184 further preferably comprises the angular values 0.2°, 0.4° and 0.8°, wherein the angular value 0.2° is assigned to each of the LED segments $LD_{11,12}$, the angular value 0.4° is assigned to each of the LED segments $LD_{13,14}$, and the angular value 0.8° is assigned to each of the LED segments $LD_{15,16}$.

The scales 180, 182, 184 here exemplify an increasing angular resolution, respectively, with the scale 180 having the lowest and the scale 184 having the highest angular resolution. Thus, with the scale 180 only a coarse orientation at a large measurement range is possible and with the scale 184 a very precise alignment with the smallest measurement range is possible. The scale 182 allows for medium-accuracy resolution at a medium-sized measurement range. A special sensor, in particular an accelerometer, can be used to implement the different levels of angular resolution.

For example, a switching between the three scales 180, 182, 184 and thus an adjustment, i.e., an increase or decrease in the angular resolution according to a given measurement situation, may be accomplished by the user repeatedly actuating the control element 106, while turning the digital spirit level 100 on and off can be achieved by, for example, the user holding down the control element 106 for a longer time, or by means of an additional on/off button.

Figure 3:
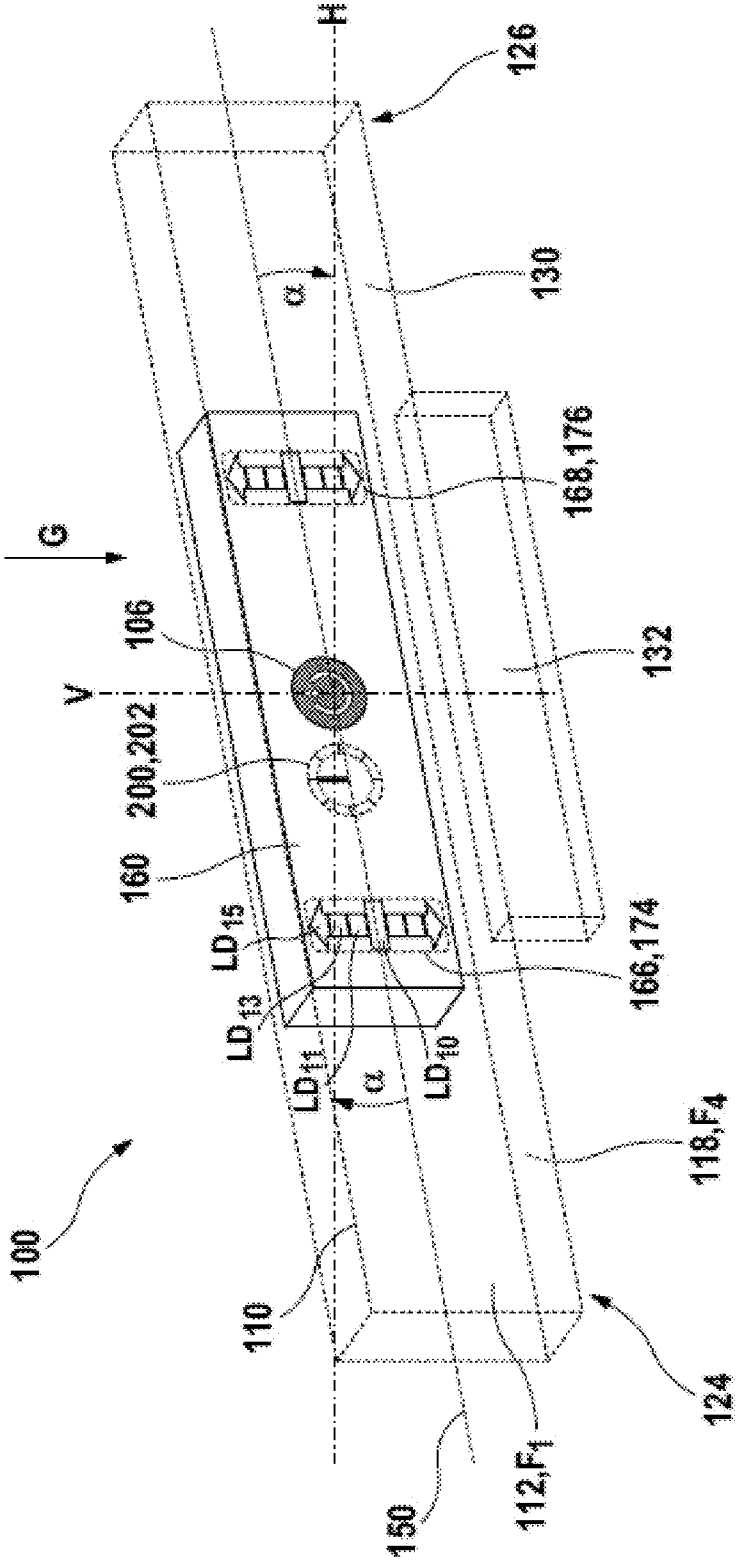

FIG. 3 shows the spirit level 100 of FIG. 1 in a side position. The spirit level 100 comprises the housing 110 with the digital display unit 160 having the two digital displays 166, 168 embodied as bar displays 174, 176. The display unit 160 in turn integrates the control element 106 as well as the input unit 200, which is embodied as a rotary knob 202. For example, the control element 106 may be designed as a contamination-insensitive film button or the like which is flush with the surface $F_1$, i.e., the front side 112, of the housing 110, and thus the digital display unit 160. By way of illustration, the longitudinal direction 150 of the housing 110 of the spirit level 100 here is tilted relative to horizontal H by the angular deviation α. The vertical Vis parallel to the orientation of the earth's gravitational field G and perpendicular to the horizontal H.

The surface $F_4$, i.e., the bottom 118, of the housing 110, forms the supporting surface 130 for the workpiece 132 to be aligned in space in the standard so-called "side position" of the spirit level 100 shown here. The side position represents the standard application position of the digital spirit level 100.

The bar display 174 signals to the user by means of the three illuminated rectangular LED segments $LD_{10,11,13}$ as well as the outermost arrow-type LED segment $LD_{15}$, that the workpiece 132 to be aligned needs to be raised in the region of the end 124 of the housing 110 of the spirit level in the direction opposite to the earth's gravitational field G, whereas the bar display 176 signals simultaneously that the workpiece 132 to be aligned needs to be lowered in the region of the end 126 of the housing 110 of the spirit level 100 to achieve the horizontal orientation of the workpiece 132. The opposing optical visualization using the two bar displays 174, 176 corresponds exactly to the required movement of the ends 124, 126 of the digital spirit level 100, thereby providing intuitive operability for the user.

FIG. 4 shows the spirit level 100 of FIG. 1 in a back position. The housing 110 of the digital spirit level 100, in turn, includes the digital display unit 160 having the digital displays 166, 168 embodied as bar displays 174, 176, the control element 106 and the input unit 200 realized as a rotary knob 202. The location of the digital spirit level 100 in space is illustrated by the vertical V, the horizontal H, and the path of the earth's gravitational field G.

Deviating in particular from the illustration of FIG. 3, in FIG. 4 the workpiece 132 to be aligned sits against the surface $F_2$, i.e., the back side 114 of the housing 110 of the digital spirit level 100, so that it is located in the so-called "back position". In the back position, the surface $F_2$ forms a further alternative supporting surface 134 for the workpiece 132 to be aligned in space.

In the back position, the digital spirit level is readable by the user viewed from above. Here, the angular deviation α is also zero, which is signaled to the user in an intuitively perceptible manner using the center LED segment, which is the only one activated, of the bar display 174. The bar display 176, on the other hand, is switched completely to the inactive mode, but may also be activated at the same time.

In order to enable measurements in both the side position and the back position by means of the digital spirit level 100, a plurality of accelerometers are provided positioned correspondingly in space, the accelerometers transmitting their measured values to the electronic control device, which is not shown here.

Figure 5:
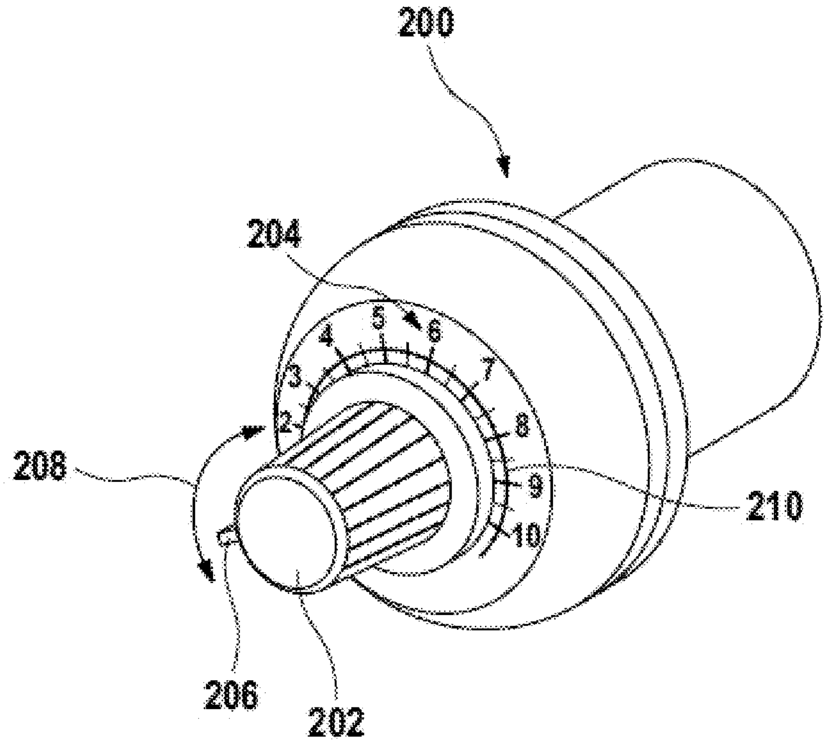

FIG. 5 illustrates an input unit 200 designed as a rotary knob, by way of example. This is, for example, designed as a slightly conical rotary knob 202 or as a rotary handle or control knob for inputting the target angle β. By way of illustration, the rotary knob 202, which may be rotated by the user in the direction of the double arrow 208, preferably has a radially outwardly directed pointer 206 that passes over a display 204 located below it and axially separated.

By way of illustration, the display 204 here is designed with a circular annular linear scale 210 that partially surrounds the knob 202. The scale 210 includes, by way of example, the angular values 0° to 10° in one-degree increments, wherein intermediate 0.5° increments are only marked with a dash without a numeral. A different scale division is also possible. The rotary knob 202 may have a detent to facilitate adjustment of certain angle values for the user by means of a haptic feedback.

Instead of pointer 206, the rotary knob 202 may have a circular annular, radially outwardly pointing scale cover, which is not illustrated, that has only one window-like recess for indicating exactly one angular value between 0° and 10° as a function of the respective position of the rotary knob 202.

In particular, in order to enable a higher resolution of a specified target angle β, the rotary knob 202 may, for example, be coupled to a reducing drive, which in turn rotates a potentiometer to generate an analog electrical value for the target angle β. Alternatively, the input unit 200 may also be realized with a multi-pass analog helical potentiometer driven by the rotary knob 202. The electrical values supplied by the respective potentiometer, which are proportional to the target angle β, can then be easily digitized and evaluated using the electronic control device, for example.

Using an increment button and a decrement button associated with the electronic control device, a digital specification of the target angle ß at a higher resolution can also be achieved.

The invention claimed is:

1. A digital spirit level comprising:

an at least substantially cuboid or prismatic housing having at least one surface designed as a supporting surface configured for placing the digital spirit level on a workpiece which is to be oriented with respect to the earth's gravitational field; and a digital display unit controlled by an electronic control device and arranged at least in a region of a further surface of the housing, the display unit being configured to display to a user an orientation of the housing with respect to the earth's gravitational field in an intuitively perceivable manner, wherein:

the digital display unit comprises at least two digital displays configured to display at least one angular deviation between a longitudinal direction of the housing and a horizontal or a vertical, or between a longitudinal direction of the housing and a target angle specified by a user, the horizontal is perpendicular and the vertical is parallel to the earth's gravitational field, the at least two digital displays are spaced apart from one another in the longitudinal direction of the housing, and the at least two digital displays are configured to display the at least one angular deviation in opposite directions in the intuitively perceivable manner.

2. The digital spirit level according to claim 1, wherein the at least two digital displays each include at least three LED segments stacked on top of one another.

3. The digital spirit level according to claim 2, wherein each of the LED segments of the at least two digital displays is configured to provide illumination, controlled by the electronic control device, in three different colors.

4. The digital spirit level according to claim 3, wherein a color of the LED segments varies as a function of a current magnitude of the angular deviation.

5. The digital spirit level according to claim 3, wherein:

at least one scale having angle values is assigned to at least one of the at least two digital displays, and the at least one scale is configured for carrying out quantitative angle measurements, and is oriented substantially parallel to the at least one digital display.

6. The digital spirit level according to claim 5, wherein a color of the at least one scale corresponds to one of the three different colors of the LED segments.

7. The digital spirit level according to claim 1, further comprising: an acoustic signal transmitter controlled by the electronic control device as a function of a magnitude of the angular deviation.

8. The digital spirit level according to claim 1, further comprising: at least one accelerometer assigned to the electronic control device to detect the angular deviation.

9. The digital spirit level according to claim 1, further comprising: an input unit configured for the user to input the target angle, the input unit being assigned to the electronic control device.

10. The digital spirit level according to claim 9, wherein the input unit includes a rotary knob having a display for specifying the target angle.

11. The digital spirit level according to claim 1, wherein the at least one digital display is a bar display having a plurality of LED segments stacked on one another.

12. The digital spirit level according to claim 11, wherein the at least two digital displays each include at least seven LED segments stacked on one another.

13. The digital spirit level according to claim 3, wherein the three different colors are green, yellow, and red.

14. The digital spirit level according to claim 4, wherein each LED segment is assigned one of the angle values.

15. The digital spirit level according to claim 8, wherein the at least one accelerometer includes a MEMS accelerometer.

16. The digital spirit level according to claim 1, wherein the at least two digital displays are arranged opposite one another in the longitudinal direction of the housing.

17. The digital spirit level according to claim 1, wherein the at least two digital displays are configured to indicate in the intuitively perceivable manner which side of the housing to raise or lower to achieve the horizontal, the vertical, or the target angle specified by a user.

18. The digital spirit level according to claim 1, wherein each of the at least two digital displays includes an arrow, and the arrow of each of the at least two digital displays points in opposite directions to indicate in the intuitively perceivable manner which side of the housing to raise or lower to achieve the horizontal, the vertical, or the target angle specified by the user.

* * * * *